US008548660B2

(12) United States Patent
Thai-Tang et al.

(10) Patent No.: US 8,548,660 B2
(45) Date of Patent: Oct. 1, 2013

(54) INTEGRATED HYBRID VEHICLE CONTROL STRATEGY (75) Inventors: Nam-Huan Thai-Tang, Bloomfield, MI (US); William J. DeFrank, Livonia, MI (US); John D. Thomas, Rochester, MI (US)

(73) Assignee: ALTe Powertrain Technologies, Inc., Auburn Hills, MI (US)

( * ) Notice: Subject to any disclaimer, the term of this patent is extended or adjusted under 35 U.S.C. 154(b) by 437 days.

(21) Appl. No.: 12/878,254

(22) Filed: Sep. 9, 2010

(65) Prior Publication Data
US 2011/0202216 A1 Aug. 18, 2011

Related U.S. Application Data (60) Provisional application No. 61/241,601, filed on Sep. 11, 2009.

(51) Int. Cl.
*B60L 11/00* (2006.01)
(52) U.S. Cl.
USPC ............................. 701/22; 701/400; 700/291
(58) Field of Classification Search
USPC .................................... 701/22, 400; 700/291
See application file for complete search history.

(56) References Cited

U.S. PATENT DOCUMENTS

| 5,790,976 | A | 8/1998 | Boll et al. | |
|---|---|---|---|---|
| 5,815,824 | A * | 9/1998 | Saga et al. | 701/22 |
| 5,913,917 | A | 6/1999 | Murphy | |
| 5,924,406 | A | 7/1999 | Kinugasa et al. | |
| 6,487,477 | B1 * | 11/2002 | Woestman et al. | 701/22 |
| 6,615,118 | B2 | 9/2003 | Kumar | |
| 6,817,964 | B2 | 11/2004 | Kayukawa et al. | |
| 7,360,615 | B2 * | 4/2008 | Salman et al. | 180/65.265 |
| 7,539,562 | B2 | 5/2009 | Maguire et al. | |
| 8,140,204 | B2 * | 3/2012 | Okubo et al. | 701/22 |
| 8,190,318 | B2 * | 5/2012 | Li et al. | 701/22 |
| 8,204,640 | B2 * | 6/2012 | Tani et al. | 701/22 |
| 2002/0069000 | A1 | 6/2002 | Nakao | |
| 2005/0228553 | A1 * | 10/2005 | Tryon | 701/22 |
| 2005/0274553 | A1 * | 12/2005 | Salman et al. | 180/65.2 |
| 2007/0112475 | A1 * | 5/2007 | Koebler et al. | 701/1 |
| 2007/0272173 | A1 * | 11/2007 | Reckels et al. | 123/41.11 |
| 2009/0012664 | A1 * | 1/2009 | Christ | 701/22 |

FOREIGN PATENT DOCUMENTS

| EP | 1129892 A1 | 9/2001 |
|---|---|---|
| WO | 2008140380 A1 | 11/2008 |
| WO | 2009103369 A1 | 8/2009 |

* cited by examiner

*Primary Examiner* — James Trammell
*Assistant Examiner* — Truc M Do (57) ABSTRACT A method for allocating energy within a vehicle comprises calculating an energy forecast for the vehicle based upon a plurality of strategy variables in a vehicle controller. The plurality of strategy variables includes driver profile information, GPS information, ESS information, environment information, accessory information, and system default parameters. The controller calculates a charging strategy based upon the energy forecast and the plurality of strategy variables and determines a control strategy for energy allocation based upon the strategy variables, energy forecast, and charging strategy. The energy is allocated to the vehicle systems based upon the control strategy.

25 Claims, 5 Drawing Sheets

INTEGRATED HYBRID VEHICLE CONTROL STRATEGY

CROSS REFERENCE TO RELATED APPLICATIONS

This application claims the benefit of U.S. Provisional Application Ser. No. 61/241,601 filed Sep. 11, 2009, the entire contents of which are hereby incorporated by reference.

TECHNICAL FIELD

The present invention relates, generally, to a vehicle having an adaptive control strategy, and more specifically, to an adaptive control strategy which utilizes predictive analysis and vehicle route mapping.

BACKGROUND

Advancements in technology and the growing concern for environmentally efficient vehicles have led to the use of alternate fuel and power sources for vehicles. Electric vehicles or hybrid electric vehicles use energy storage systems (ESS) to provide power for various vehicle requirements. However, the vehicles must generate and recharge the ESS for continued usage.

Commonly hybrid electric vehicles rely on torque and ESS state of charge to determine whether or not the generator needs to be activated to recharge the ESS. If the ESS state of charge falls below a set schedule then the generator is activated. It is desirable to create optimal charging schedules to recharge the ESS while providing minimal interruption to the operation of the vehicle. For an electric vehicle there is no way to recharge the ESS while the vehicle is drawing power. As a result, it is critical to be able to allocate the available energy to critical systems in an electric vehicle to ensure that the vehicle can reach the destination or next charging opportunity.

Therefore, predicting the energy consumption required prior to and during the drive cycle in order to ensure energy availability and optimal charging schedules is desirable.

SUMMARY

A method for allocating energy within a vehicle comprises calculating an energy forecast for the vehicle based upon a plurality of strategy variables in a vehicle controller. The plurality of strategy variables includes driver profile information, GPS information, ESS information, environment information, accessory information, and system default parameters. The controller calculates a charging strategy based upon the energy forecast and the plurality of strategy variables and determines a control strategy for energy allocation based upon the strategy variables, energy forecast, and charging strategy. The energy is allocated to the vehicle systems based upon the control strategy. Allocating energy to the vehicle systems based upon the control strategy includes limiting at least one of a plurality of vehicle functions when the energy forecast predicts that the vehicle has insufficient power. The vehicle route is monitored and the energy forecast, charging strategy and control strategy are recalculated when the vehicle deviates from a predetermined route or the calculated energy forecast.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
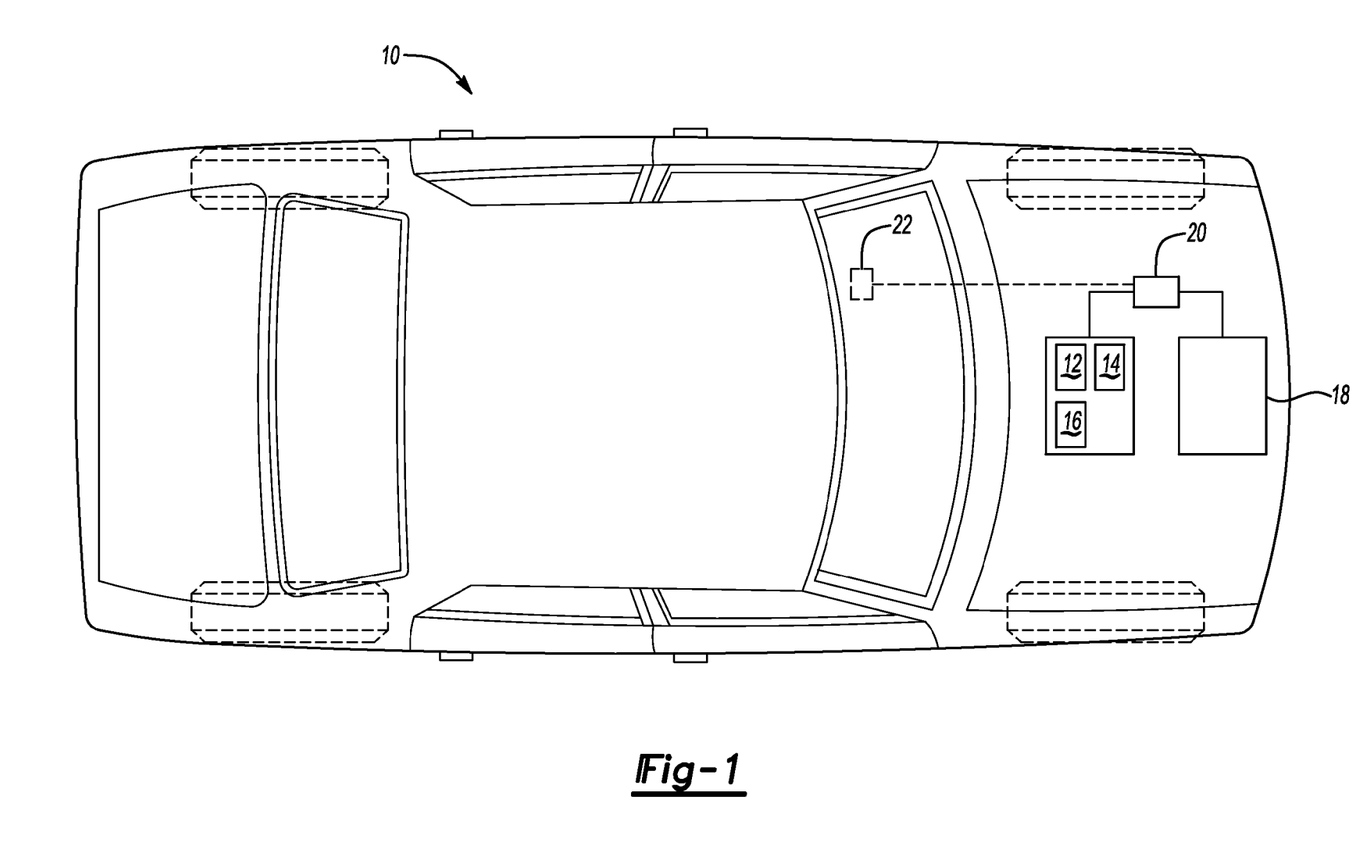
FIG. 1 is a schematic illustration of an electric vehicle having a controller utilizing an adaptive control strategy.

Referring to the Figures, wherein like reference numbers refer to the same or similar components throughout the several views, FIG. 1 schematically illustrates a vehicle 10 including at least one motor 12, a least one generator 14 and an energy storage system (ESS) 16. The vehicle 10 may be an electric vehicle or a hybrid electric vehicle. Therefore, in addition to the at least one motor 12 the vehicle 10 may also include an internal combustion engine 18. The vehicle 10 also include a controller 20 which is utilized to control functions of the vehicle 10 including recharging the ESS 16, starting/stopping the engine 18, etc. The ESS 16 includes at least one battery and is preferably a battery pack for providing energy to various systems for the vehicle 10.

The vehicle 10 also preferably includes a global positioning system (GPS) 22 which has map and position data for the vehicle 10. The GPS 22 also preferably provides weather and traffic information as well. The GPS 22 is connected to the controller 20. The controller 20 determines a control strategy 24 (shown in FIG. 2) for charging the ESS 16 based upon vehicle 10 information, including the information from the GPS 22. The control strategy 24 may be continually or frequently adapted based upon the changing information for the vehicle 10.

Figure 2:
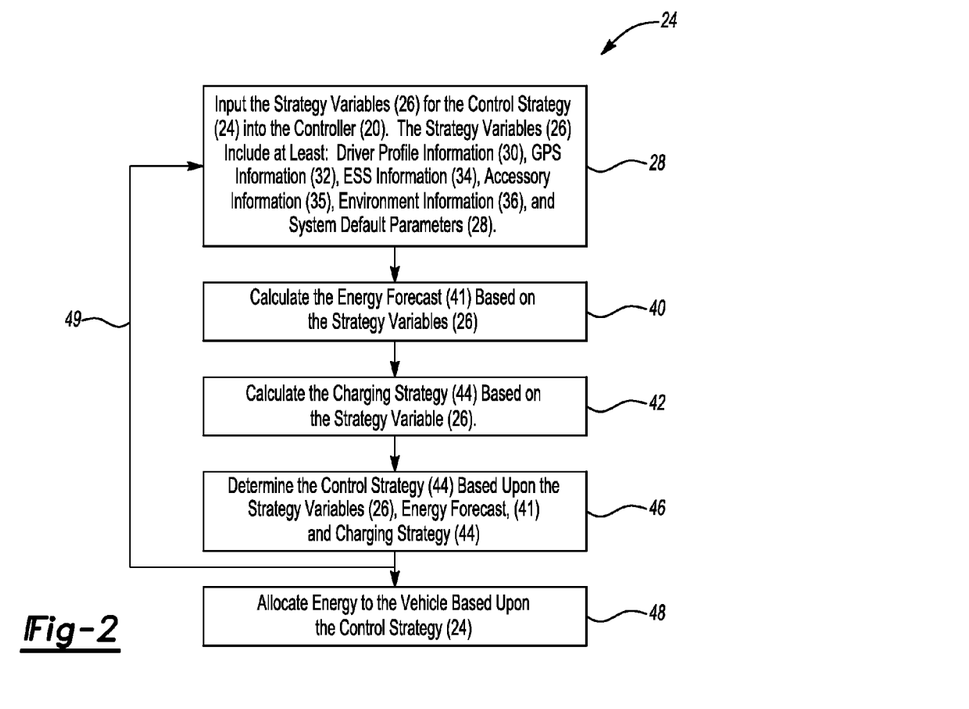
FIG. 2 is a schematic illustration of a first embodiment of a method for managing the adaptive control strategy for the vehicle of FIG. 1.

The control strategy 24 also determines the allocation of energy to all systems of the vehicle 10. This would include, for example, the motor, the ESS 16, the radio, the heating/cooling system, windshield wipers, etc. Based upon the vehicle 10 information the control strategy 24 allocates or restricts power to the various vehicle 10 systems.

Referring to FIG. 2, an embodiment for determining the control strategy 24 is described. Determining the control strategy 24 begins by inputting strategy variables 26, which are included in determining the control strategy 24, into the controller 20, step 28. The strategy variables 26 include, but are not limited to: driver profile information 30, GPS information 32, ESS information 34, accessory information 35, environment information 36, and system default parameters 38.

The GPS information 32 may include current vehicle location, vehicle destination, and route information. The environment information 36 may be supplied from the GPS 32 or separately supplied by the vehicle 10 to the controller 20 and may include, ambient temperature, day, time, humidity, weather (current and forecasted), 3-D maps, topological data, solar loads, and other weather and vehicle 10 related data.

The controller 26 then uses the strategy variables 26 to create an energy forecast 41, step 40. The energy forecast 41 is the predicted maximum energy that will be required by the vehicle 10 based upon the strategy variables 26.

Based upon the strategy variables 26 the controller 20 also predicts the ESS charging strategy 44, step 42. The ESS charging strategy 44 is based upon the energy requirements of the ESS 16 and the regeneration opportunities available to determine the necessary and optimal charging times for the ESS 16.

The controller 20 then determines the control strategy 24 using the strategy variables 26, the energy forecast 41, and the calculated charging strategy 44, step 46. The control strategy 24 directs how the energy for the vehicle 10 should be distributed among the motor 12, ESS 16, vehicle accessories, and other vehicle systems.

The controller 20 utilizes the control strategy 24 to allocate the energy to the various systems of the vehicle 10, step 48. Allocating the energy, step 48, includes providing intelligent controls of the amount of energy and power provided to the various subsystems to control the associated peak and nominal loads. Additionally, the controller 20 periodically repeats the determination of the control strategy 24 as the information for the vehicle 10 is updated, illustrated at 49.

Figure 3:
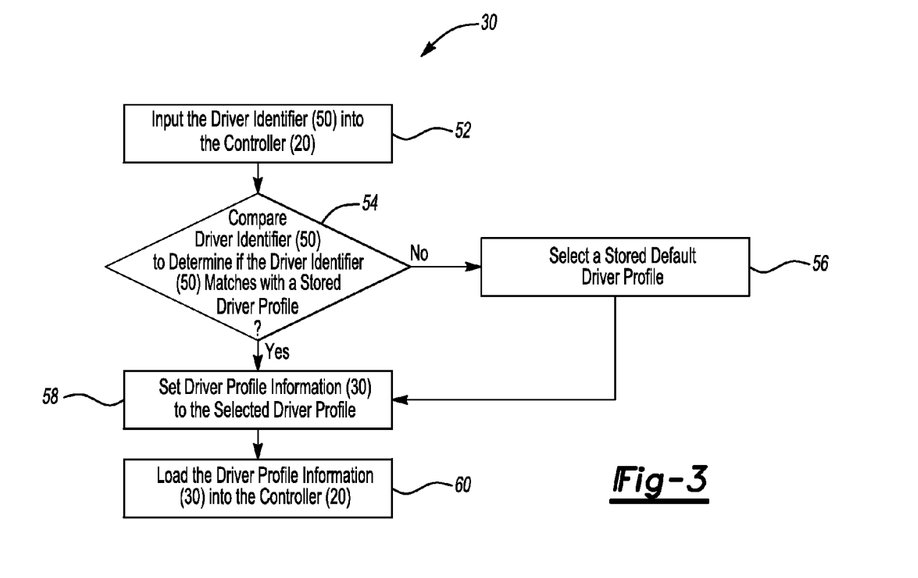
FIG. 3 is a schematic illustration of a first embodiment of a method for determining driver profile information for the vehicle of FIG. 1.

Referring to FIG. 3, an embodiment for determining the driver profile information 30 is illustrated. A driver identifier 50 is input into the controller 20, step 52. The driver identifier 50 may input by a code the driver inputs to the vehicle 10 through the GPS 22 or stored in a key for the vehicle. When the driver identifier 50 is input, the controller 20 checks with stored information to determine if a driver profile is associated that driver identifier 50, step 54. If no driver profile is associated with the driver identifier 50 then the system selects a stored default driver profile, step 56. Additionally, if a driver identifier 50 is not input or is improperly recorded then the controller 20 may use the default driver profile. The driver profile information 30 is then set to the selected driver profile, step 58. The driver profile information 30 is then loaded into the controller 20, step 60.

The driver profile information 30 may include driver route history, driving habits/patterns, driver preference settings, such as temperature and audio preferences, and other driver history information. The driver route history may also include known routes for that driver that may be associated with a specific time of the day as well as associated with specific accessory usage.

Ascertaining the driver profile information 30 quickly assists the controller 20 in quickly and accurately determining the control strategy 24. The driver profile information 30 includes a pattern recognition algorithm that calculates the number or starts and stops, the rate of acceleration and deceleration, accessory loads for specific driving events, etc. The default driver profile includes default values for the individual variables which are programmed into the controller 20 and is based upon average data and learned behavior of the vehicle 10. As mentioned above, the values of the parameters of the driver profile information 30 will be time or event specific to more accurately assist in determining the control strategy 24.

Figure 4:
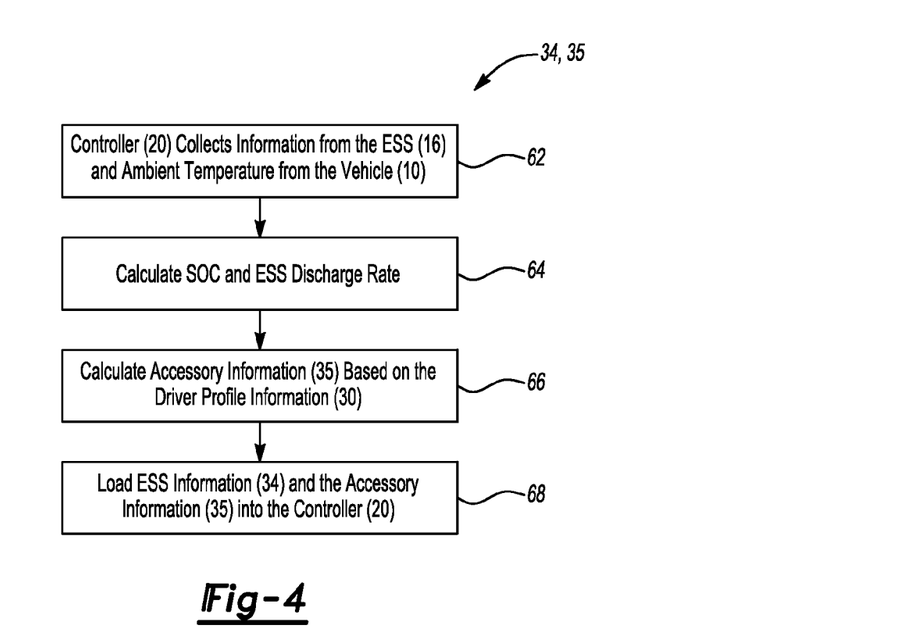
FIG. 4 is a schematic illustration of a first embodiment of a method for determining ESS information and accessory information for the vehicle of FIG. 1.

FIG. 4 illustrates an embodiment for determining the ESS information 34 and the accessory information 35. The controller 20 collects data from the ESS 16, step 62. Additionally, the controller 20 utilizes the environment information 36 including at least the ambient temperature. The ESS 16 information 34 includes voltage, current, charge and discharge history, ESS 16 temperature, and other ESS 16 data. The ESS information 34 further includes a determination of predicted cooling/heating requirements of the ESS 16 based on the ESS 16 temperature and the ambient temperate. Based on the ESS information 34 the controller 20 calculate the ESS state of charge (SOC) and the ESS discharge rate based on the relevant temperatures and time, step 64.

In addition the controller 20 may also calculate the accessory information 35 at the same time the ESS information 34 is obtained, step 66. The accessory information 35 is the power required by each of the accessory systems for the vehicle 10. The accessory information 35 may include all systems of the vehicle 10 which utilize power separately from the ESS 16. The accessory information 35 is based upon on the driver profile information 30, the environment information 36, and the system default parameters 28. The accessory power requirements 35 are based upon a learned pattern from the driver profile information (30) and the environment information 36 including, humidity, temperature, sun load, time of day, air conditioning usage, heat usage, defrost usage, windshield wiper usage, navigation information 32, etc. Each parameter associated with the driver profile information 30 and the environment information 36 is assigned a value based upon current vehicle 10 conditions. Based upon the assigned values the energy requirements for each of the vehicle 10 systems is determined. The ESS information 30 and the accessory power requirements 35 is then loaded into the controller 20, step 68.

Figure 5:
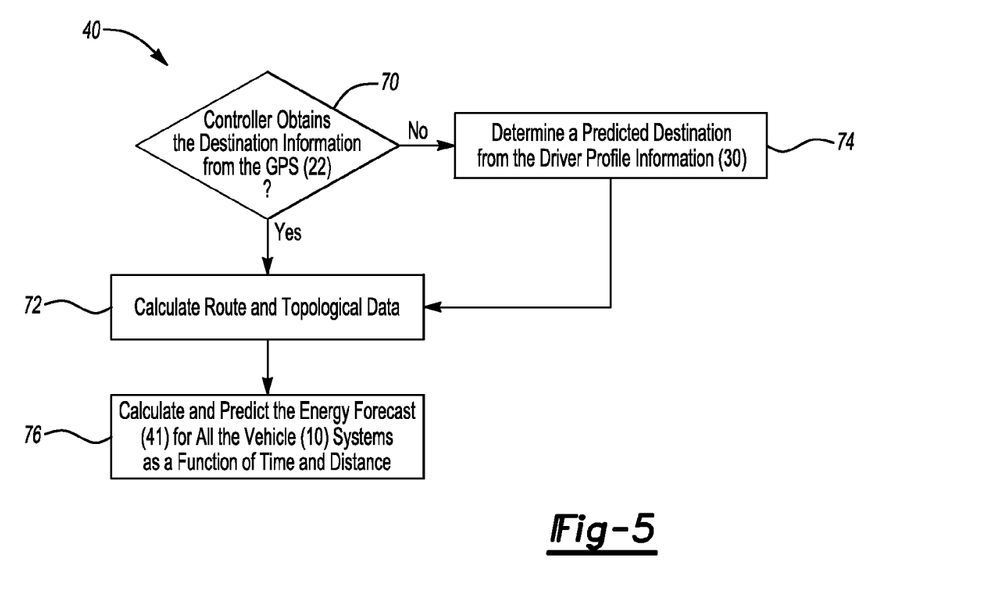
FIG. 5 is a schematic illustration of a first embodiment of a method for calculating an energy forecast for the vehicle of FIG. 1.

FIG. 5 illustrates an embodiment for calculating the energy forecast 41, step 40. The controller 20 determines whether destination information from the GPS 22 is available, step 70. If no destination information is input the controller determines the most likely target destination based upon the driver profile information 30 including previous driver destinations associated with the time of the day, step 72. The destination information or predicted destination information is used to calculate the route information which is used to get to that destination and the associated topological data, step 74. The route information is then used to calculate and predict the energy forecast 41, step 76.

The energy forecast 41 includes the information from the driver profile information 30 such as speed, acceleration, deceleration, accessories load (power steering load, brake loads AC loads, etc.) and predicts the maximum expected energy required for the driver over the given route. As mentioned above, predicting the energy forecast 41 using the route information also includes utilizing the ESS information 34 and the accessory power requirements 35. The energy forecast 41 includes the predicted maximum energy requirements for each of the various vehicle 10 systems not just the motor 12 and ESS 16.

The energy forecast 41 utilizes the following equation:

$$E_{REQ} = \Sigma(F \times v \times D) + E(\text{Accessory power requirements 35})$$

where $E_{REQ}$ is the energy the vehicle 10 requires, F is the force required to move the vehicle, v is the velocity of the vehicle 10, and D is the distance of travel of the vehicle 10.

Additionally, the power at each wheel ($P_{WHEEL}$) can be calculated by:

$$P_{WHEEL} \Sigma F \times v = (F_{ACCEL} + F_{ASCEND} + F_{DRAG} + F_{LOSSES}) \times v$$

where $P_{WHEEL}$ is the power at the wheel, $F_{ACCEL}$ is the force on the vehicle due to acceleration, $F_{ASCEND}$ is the force required to drive the vehicle 10, $F_{DRAG}$ is the force on the vehicle 10 due to drag, and $F_{LOSSES}$ is the force on the vehicle 10 as a result of energy losses. Further, $F_{ASCEND}$ can be calculated by:

$$F_{ASCEND} = (ma + mg \sin A + mgCrr \cos A + \tfrac{1}{2}\rho(CDA)\rho v \text{ (aero)}^2)$$

where, m is the mass of the vehicle 10, a is the acceleration of vehicle, g is the force of gravity, $\rho$ is the density of air, A is the grade of the road, Crr is the coefficient of rolling resistance, CDA is the frontal area of the vehicle, and aero is the aerodynamic resistance of the vehicle.

Figure 6:
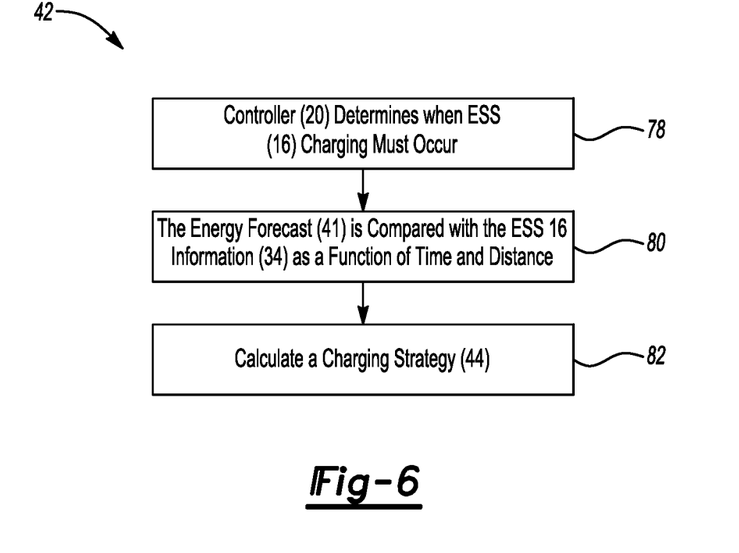
FIG. 6 is a schematic illustration of a first embodiment of a method for calculating an charging strategy for the vehicle of FIG. 1.

FIG. 6 illustrates an embodiment for determining the charging strategy 44, step 42. The controller 20 calculates the ESS 16 charging requirements, step 78. The charging strategy 44 includes determining if there will be an energy depletion based upon, energy forecast 41 and the energy available as a function of time and distance is calculated, step 80. Additionally, the charging strategy 78 may use the GPS information 32 and the environment information 36, (including the weather, and 3-D maps) to determine optimal opportunities for the charging the ESS 16. The charging strategy 78 also includes the amount of regenerative breaking required to charge the ESS 16, the total amount of energy required, and the maximum power required. Using this information an algorithm calculates the charging strategy 44, step 82.

Figure 7:
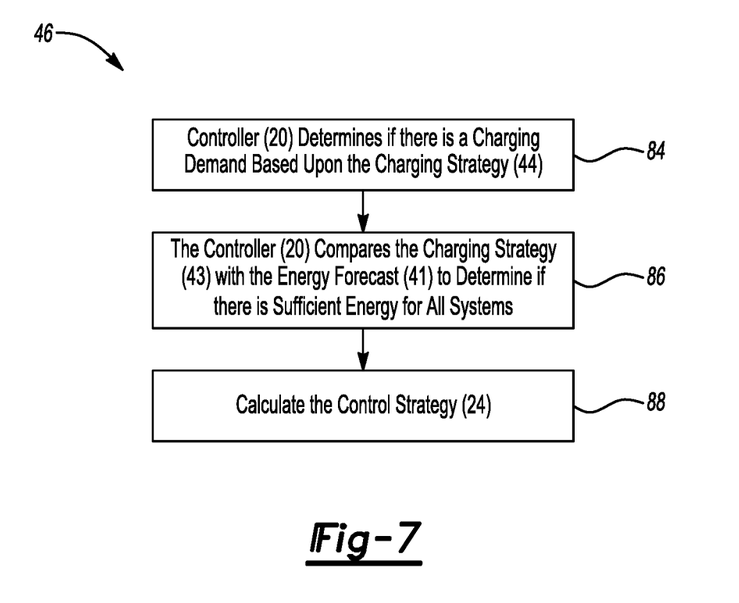
FIG. 7 is a schematic illustration of a first embodiment of a method for calculating the control strategy for the vehicle of FIG. 1.

FIG. 7 illustrates an embodiment for calculating the control strategy 24. Based upon the charging strategy 44 the controller 20 determines if sufficient energy will be available to all systems for the vehicle 10 at all times. If there is insufficient energy the control strategy 24 determines which system should receive energy, how much they should receive and which systems should be limited in their energy usage. The control strategy 24 utilizes a priority ranking for the individual vehicle 10 systems. The priority ranking is based upon the functions of the individual systems and whether the system is a critical or non-critical system. For example, critical systems may include, supplemental restraint systems (SRS), brakes, the motor 12, etc. Preferably non-critical, non-important systems, such as high heating/cooling usage, audio equipment may be limited in their energy use to maximize the vehicle 10 range and power. Additionally, the tip speed and acceleration of the vehicle 10 may be limited to preserve energy.

As discussed above, the control strategy 24 includes determining the amount of energy required to reach the next energy source, whether primary (regenerative braking to charge the ESS 16) or secondary (service station, recharge station, battery exchange station, etc). The controller 20 periodically repeats the determination of the control strategy 24 as the information for the vehicle 10 is updated and provides a new control strategy 24, illustrated at 49 (shown in FIG. 1).

Figure 8:
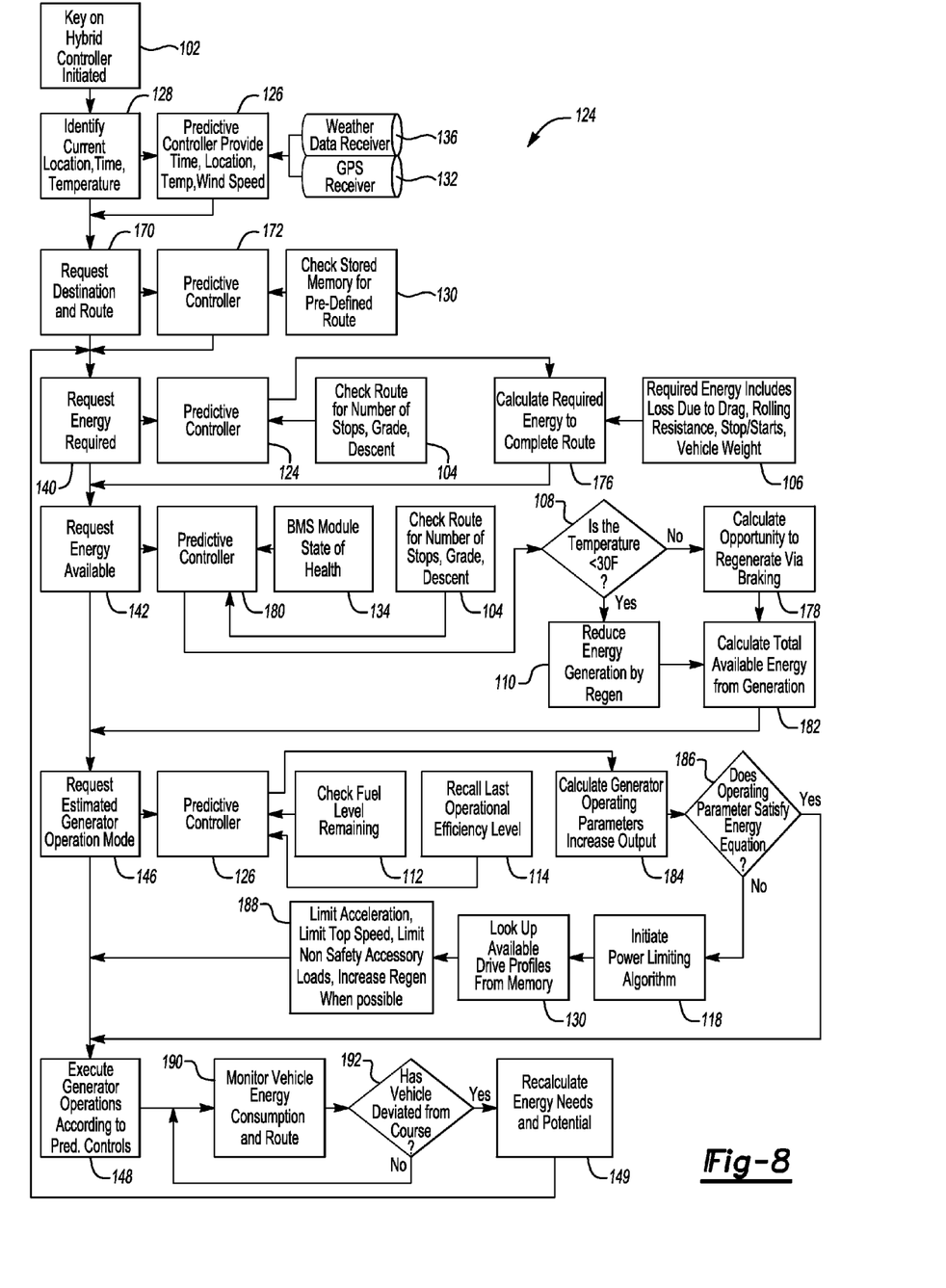
FIG. 8 is a schematic illustration of a second embodiment of a method for calculating the control strategy for the vehicle of FIG. 1.

FIG. 8 illustrates another embodiment of a control strategy 124 for the vehicle 10. The controller 20 for the vehicle 10 (shown in FIG. 1) is initiated when the vehicle 10 is started, step 102. The controller 20 determines the strategy variables including the time, location, temperature, and wind speed, step 126. Determining the strategy variables 126 may include utilizing data from a weather data receiver 136 and a GPS receiver 132. The controller 20 then requests the destination and route information, step 170. The destination and route data may include checking the vehicle 10 memory for a pre-defined route based upon the stored driver information, step 130. The controller 20 may use the data to predict a route and destination based upon the stored information, step 172.

The controller 20 requests the energy required by the vehicle 10, step 140. That is, the controller 20 requests the energy forecast for the vehicle 10. The controller 20 collects the strategy variables, represented at 126. The information collected may include the route information including the number of stops, grade, descent, etc, step 104. The controller 20 calculates the required energy to complete the route, i.e. calculates the energy forecast, step 176. The required energy calculation includes energy losses due to drag, rolling resistance, stops and starts, and vehicle weight, represented at 106.

The controller 20 requests the energy available from the vehicle 10, step 142. The controller 20 collects the ESS 16 information including the BMS module state of health, step 134. The information collected may include the route information including the number of stops, grade, and decent, etc., represented at 104. The controller 20 then determines in the external vehicle temperature is less then 30 degrees Farenheight, step 108. If not then the controller 20 calculates then next regeneration opportunity by the vehicle 10, step 178. If the temperature is below 30 degrees F. the controller 20 reduces the energy generation available to compensate for the cold, step 110. The controller 20 then calculates the total available energy from generation, step 182.

The generator operation mode is requested, step 146. The generation operation mode is used to increase the amount of power available when possible and is the charging strategy for the vehicle 10. The controller 20 uses the strategy variables, represented at 126. This includes checking the remaining fuel level, step 112, and recalling the last operational efficiency level, step 114. The generator operating parameters are calculated for increased vehicle output, step 184. The controller 20 checks to see if the energy required for the operating parameter is sufficient, step 186. That is, the controller 20 compares the charging strategy with the energy forecast to determine if there is sufficient energy. If not the controller 20 initiates a power limiting algorithm for the vehicle 10, step 118. The drive profile information is collected from memory, 130. The controller 20 limits the acceleration, top speed, non-safety accessory loads of the vehicle 10, and increases the amount of regeneration when possible, step 188.

Based upon the collected and calculated date the controller 20 executes the generation operating parameters, step 148. That is the controller 20 allocates the energy to the vehicle 10 based upon the control strategy determined using the calculated energy forecast and charging strategy.

As the vehicle 10 operates the controller 20 continues to monitor the vehicle 10 energy consumption and route, step 190. As long as the vehicle 10 remains on course the controller 20 continues to monitor the energy consumption and route, step 192. If the vehicle 10 deviates from the course the controller 26 recalculates the energy needs and potential, step 149.

While the best modes for carrying out the invention have been described in detail, those familiar with the art to which this invention relates will recognize various alternative designs and embodiments for practicing the invention within the scope of the appended claims.

The invention claimed is:

1. A method for allocating energy within a vehicle, comprising:
   calculating an energy forecast for the vehicle based upon a plurality of strategy variables in a vehicle controller, wherein the plurality of strategy variables include:

driver profile information, global positioning system (GPS) information, energy storage system (ESS) information, accessory information, and system default parameters;
calculating a charging strategy based upon:
the calculated energy forecast, and the plurality of strategy variables;
determining a control strategy for energy allocation based upon:
the plurality of strategy variables, the calculated energy forecast, and the calculated charging strategy;
allocating energy to vehicle systems based upon:
the determined control strategy including:
limiting at least one of a plurality of vehicle functions when the calculated energy forecast predicts that the vehicle has insufficient power; and
monitoring a vehicle route for
recalculating: the energy forecast and the charging strategy for determining a new control strategy of the vehicle when the vehicle deviates from one of a predetermined route and the calculated energy forecast.

2. The method of claim 1, further comprising:
inputting the driver profile information by:
inputting a driver identifier into the vehicle controller;
selecting one of a corresponding driver profile and a default driver profile; and
calculating driver information by utilizing an algorithm based upon a profile selected during the selecting step.

3. The method of claim 2, wherein the step of inputting the driver profile information includes:
inputting at least one of: a driver route history, at least one driving habit, a preferred driver temperature setting, and a preferred driver audio setting.

4. The method of claim 3, wherein the step of inputting the driver profile information further includes:
associating the driver route history with: a time of the day that the vehicle is driven and an associated accessory usage.

5. The method of claim 1 further comprising:
inputting the GPS information, wherein the GPS information includes at least one of: a current vehicle location, vehicle destination, vehicle route, 3D maps, topological data, traffic information, and points of interest.

6. The method of claim 5, wherein the step of inputting the GPS information includes:
calculating a vehicle loss due to: drag, rolling resistance and start and stops of the vehicle for the vehicle route.

7. The method of claim 5, wherein the GPS information includes a number of: vehicle stops and vehicle route grades and descents.

8. The method of claim 1, wherein the step of limiting at least one of a plurality of vehicle functions continues until one of:
reaching a destination, and
utilizing a vehicle forecast for determining if the vehicle has sufficient energy based upon the predicted energy forecast.

9. The method of claim 1, wherein the step of limiting at least one of the plurality of vehicle functions includes at least one of:
limiting a vehicle acceleration level,
limiting a top speed of the vehicle, and
limiting non-safety accessory loads on the vehicle.

10. A method for allocating energy within a vehicle comprising:
calculating an energy forecast for the vehicle based upon a plurality of strategy variables in a vehicle controller, wherein the plurality of strategy variables include:
driver profile information, global positioning system (GPS) information, energy storage system (ESS) information, accessory information, and system default parameters;
calculating a charging strategy based upon the calculated energy forecast and the plurality of strategy variables;
determining a control strategy for energy allocation based upon:
the plurality of strategy variables, the calculated energy forecast, and the calculated charging strategy;
allocating energy to vehicle systems based upon the control strategy by:
limiting at least one vehicle function when the calculated energy forecast predicts that the vehicle has insufficient power for a predetermined route and calculated charging strategy wherein the step of limiting the at least one vehicle function continues until one of:
reaching a destination, and
utilizing a vehicle forecast for determining if the vehicle has sufficient energy based upon the predicted energy forecast.

11. The method of claim 10, wherein the step of limiting at least one vehicle function includes at least one of:
limiting a vehicle acceleration level,
limiting a top speed of the vehicle, and
liming non-safety accessory loads on the vehicle.

12. The method of claim 10 further comprising:
inputting the driver profile information by:
inputting a driver identifier into the vehicle controller;
selecting one of a corresponding driver profile and a default driver profile; and
calculating driver information by utilizing an algorithm based upon a profile selected during the selecting step.

13. The method of claim 12, wherein the step of inputting the driver profile information includes:
inputting at least one of: a driver route history, at least one driving habit, a preferred driver temperature setting, and a preferred driver audio setting.

14. The method of claim 13, wherein the step of inputting the driver profile information includes:
associating the driver route history with: a time of the day that the vehicle is driven and an associated accessory usage.

15. The method of claim 10 further comprising:
inputting the GPS information, wherein the GPS information includes: at least one of: a current vehicle location, vehicle destination, vehicle route, 3D maps, topological data, traffic information, and points of interest.

16. The method of claim 15, wherein the step of inputting the GPS information includes:
calculating vehicle loss due to: drag, rolling resistance and start and stops of the vehicle for the vehicle route.

17. The method of claim 15, wherein the GPS information includes number of: vehicle stops and vehicle route grades and descents.

18. The method of claim 1, wherein the plurality of strategy variables further includes:
environment information, wherein the method further comprises the step of:
supplying the environment information to the vehicle controller.

19. The method of claim 18, wherein a global positioning system conducts the step of supplying the environment information to the vehicle controller.

20. The method of claim 18, wherein the environment information includes ambient temperature, current weather and forecasted weather.

21. The method of claim 20, wherein the environment information further includes: date information, time information, humidity information, 3-D map data, topological data, solar load data, air conditioning usage data, heat usage data, defrost usage data and windshield wiper usage data.

22. The method of claim 10, wherein the plurality of strategy variables further includes:
   environment information, wherein the method further comprises the step of:
      supplying the environment information to the vehicle controller.

23. The method of claim 22, wherein a global positioning system conducts the step of supplying the environment information to the vehicle controller.

24. The method of claim 22, wherein the environment information includes ambient temperature, current weather and forecasted weather.

25. The method of claim 24, wherein the environment information further includes: date information, time information, humidity information, 3-D map data, topological data, solar load data, air conditioning usage data, heat usage data, defrost usage data and windshield wiper usage data.

* * * * *